(12) United States Patent
Yamamoto et al.

(10) Patent No.: US 9,204,617 B2
(45) Date of Patent: Dec. 8, 2015

(54) PET TOILET

(71) Applicant: KAO CORPORATION, Tokyo (JP)

(72) Inventors: Jun Yamamoto, Utsunomiya (JP); Takahiro Kashiwa, Tokyo (JP); Yuichi Takeshige, Utsunomiya (JP)

(73) Assignee: KAO CORPORATION, Tokyo (JP)

( * ) Notice: Subject to any disclaimer, the term of this patent is extended or adjusted under 35 U.S.C. 154(b) by 17 days.

(21) Appl. No.: 14/349,058

(22) PCT Filed: Oct. 11, 2012

(86) PCT No.: PCT/JP2012/076293
§ 371 (c)(1),
(2) Date: Apr. 1, 2014

(87) PCT Pub. No.: WO2013/054836
PCT Pub. Date: Apr. 18, 2013

(65) Prior Publication Data
US 2014/0251224 A1    Sep. 11, 2014

(30) Foreign Application Priority Data

Oct. 14, 2011   (JP) .................................. 2011-226783
Oct. 14, 2011   (JP) .................................. 2011-226784

(51) Int. Cl.
*A01K 1/01*    (2006.01)

(52) U.S. Cl.
CPC ............. *A01K 1/0107* (2013.01); *A01K 1/0114* (2013.01); *Y10T 29/49716* (2015.01)

(58) Field of Classification Search
CPC .......................... A01K 1/0107; A01K 1/0114
USPC ........................... 119/165, 166, 161, 168, 169
See application file for complete search history.

(56) References Cited

U.S. PATENT DOCUMENTS 2,963,003 A * 12/1960 Oberg et al. ................... 119/166
3,752,120 A *  8/1973 Pallesi ........................... 119/166
(Continued)

FOREIGN PATENT DOCUMENTS

JP          61-146134 A      7/1986
JP          2002-532076 A   10/2002
(Continued)

OTHER PUBLICATIONS

International Preliminary Report on Patentability and Written Opinion of the International Searching Authority mailed Apr. 24, 2014 for International Application No. PCT/JP2012/076293.
(Continued)

*Primary Examiner* — Yvonne Abbott-Lewis
(74) *Attorney, Agent, or Firm* — Birch, Stewart, Kolasch & Birch, LLP

(57) ABSTRACT

A pet toilet includes an outer and inner container. A lower outer sidewall portion having a lower sidewall provided on a sidewall of the outer container, and a lower inner sidewall portion having a lower sidewall provided on a sidewall of the inner container. The outer and inner containers are movable. A pet entrance that is lower than an adjacent sidewall formed by arranging the inner container into the outer container, such that the position of the lower outer sidewall portion matches the position of the lower inner sidewall portion. Further, the lower outer sidewall portion is closed by the sidewall of the inner container and the lower inner sidewall portion is closed by the sidewall of the outer container by arranging the inner container into the outer container, such that the position of the lower outer sidewall portion does not match the position of the lower inner sidewall portion.

13 Claims, 11 Drawing Sheets

(56) References Cited

U.S. PATENT DOCUMENTS

| | | | | |
|---|---|---|---|---|
| 4,217,857 A | * | 8/1980 | Geddie | 119/166 |
| 4,505,226 A | * | 3/1985 | Carlson | 119/166 |
| 4,802,442 A | | 2/1989 | Wilson | |
| 5,293,837 A | * | 3/1994 | Caldwell | 119/166 |
| 6,354,243 B1 | * | 3/2002 | Lewis et al. | 119/165 |
| 7,131,396 B2 | | 11/2006 | Matsuo et al. | |
| 8,522,719 B2 | * | 9/2013 | Feld | 119/168 |
| 8,622,023 B1 | * | 1/2014 | Tierney | 119/165 |
| 2006/0124068 A1 | | 6/2006 | Matsuo et al. | |
| 2009/0038554 A1 | * | 2/2009 | Tsutsumi et al. | 119/166 |
| 2010/0071628 A1 | * | 3/2010 | Wells | 119/169 |
| 2013/0133585 A1 | * | 5/2013 | Hecht | 119/166 |

FOREIGN PATENT DOCUMENTS

| | | |
|---|---|---|
| JP | 2005-6605 A | 1/2005 |
| JP | 2005-143401 A | 6/2005 |
| JP | 2005-151950 A | 6/2005 |
| JP | 3112544 U | 8/2005 |
| JP | 2010-284089 A | 12/2010 |
| JP | 2011-4664 A | 1/2011 |
| WO | WO 00/35272 A1 | 6/2000 |

OTHER PUBLICATIONS

International Search Report, mailed Dec. 25, 2012, cited in PCT/JP2012/076293.

* cited by examiner

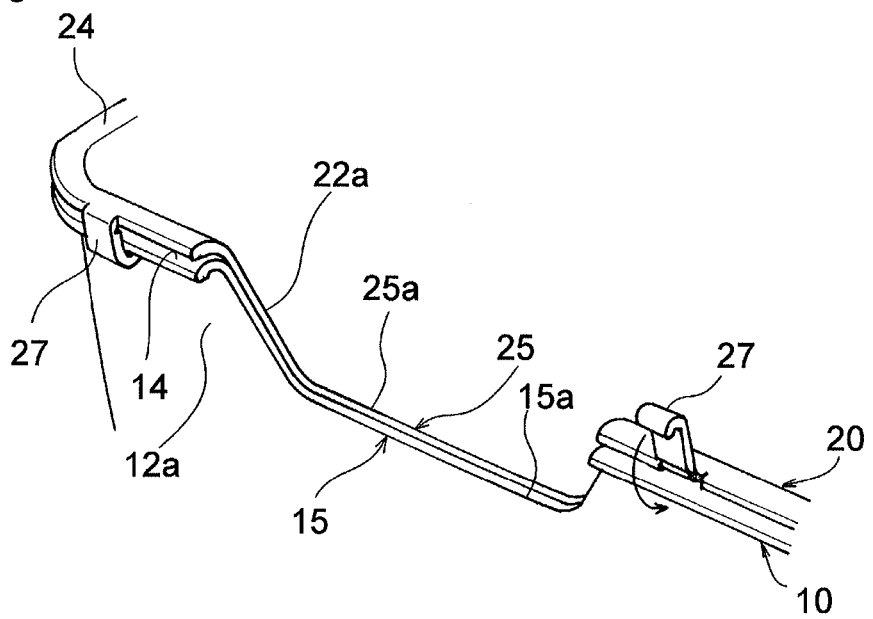

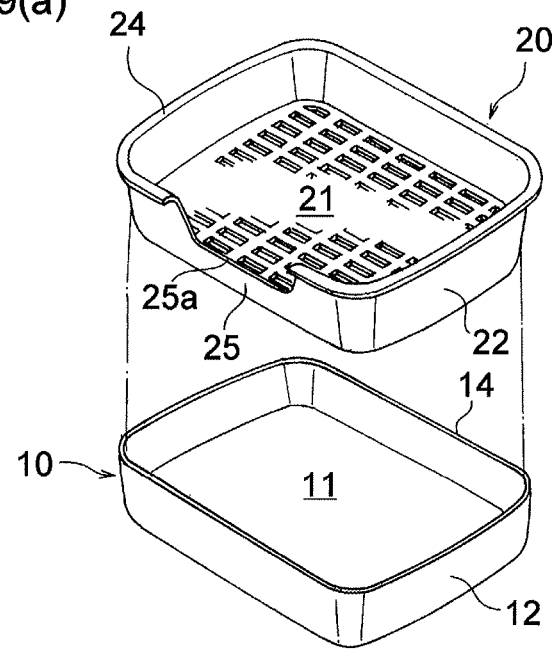
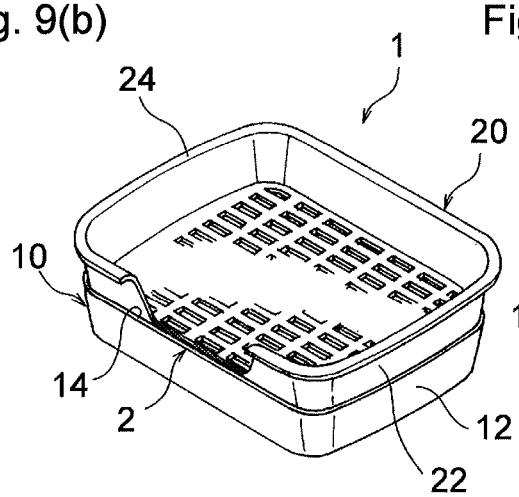
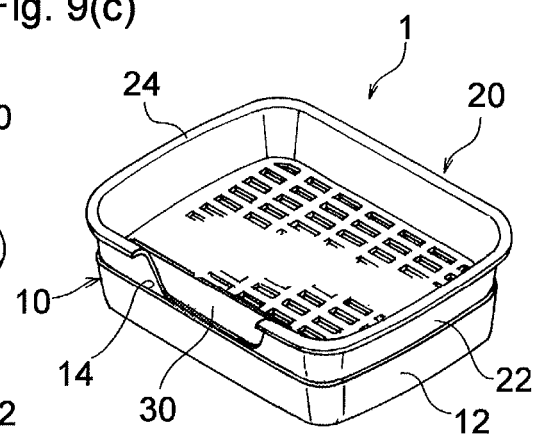

PET TOILET

TECHNICAL FIELD

The present invention relates to a pet toilet used for disposing excretory fluid of a pet (small animal) such as a cat or a dog.

BACKGROUND ART

There has been known a product including a tray-like container with a bottom covered with a liquid absorbent material, such as sand, as a pet toilet for disposing excretory liquid (urine) of a pet such as a cat or a dog. When a person cares for a cat by using such toilet, he/she needs to prevent scattering of sand, since a cat has a behavior of throwing sand on an excretion place after the excretion. For this purpose, a sidewall of a tray storing sand in the pet toilet has to be made high. For example, Patent Literature 1 describes an animal toilet including a rectangular granular matter storing container in plan view, wherein sidewalls are formed on three faces, and the remaining one face is formed low to set a gate. In this toilet, scattering of sand from the gate cannot be prevented. Therefore, in the Patent Literature 1, another member is arranged on the gate to prevent the scattering of sand. However, the arrangement of another member leads to an increase in the number of components of the toilet, and this is uneconomical. Since the position of the gate is high in the toilet described in the Patent Literature 1, the gate is higher than an eye line of a young small animal that is cared for, and the animal is difficult to recognize the position of the gate. Even if it can recognize the gate, the gate is too high, so that it cannot go in the toilet. The same applies to an animal having low physical performance due to old age or disease.

A toilet described in Patent Literature 2 has been known as a toilet that can be used for a cat that cannot go over a high sidewall due to decrease in physical performance. In this toilet, instead of forming a gate into a slope having a small height, and the slope with an opening from which sand can drop downward is formed. However, this slope is only used to keep a kitten or a cat having low physical performance, and it is unnecessary to keep a healthy mature cat. Accordingly, when a healthy mature cat is kept, the size of the toilet is increased by the size of the slope.

CITATION LIST

Patent Literature

Patent Literature 1: U.S. Pat. No. 7,131,396B2
Patent Literature 2: JP2010-284089A

SUMMARY OF INVENTION

The present invention provides a pet toilet including an outer container including a bottom, and a sidewall standing from a peripheral edge of the bottom; and an inner container including a bottom having a duckboard structure that allows excretory fluid of a pet to pass, and a sidewall standing from a peripheral edge of the bottom.

In the pet toilet, a lower outer sidewall portion is formed on a part of the sidewall of the outer container, the lower outer sidewall portion having a lower height than the other part of the sidewall of the outer container, and a lower inner sidewall portion is formed on a part of the sidewall of the inner container, the lower inner sidewall portion having a lower height than the other part of the sidewall of the inner container.

The outer container and the inner container are relatively movable.

An entrance for pet is formed in the toilet by arranging the inner container into the outer container in such a manner that the position of the lower outer sidewall portion matches the position of the lower inner sidewall portion, a height of the entrance is lower than that of a sidewall adjacent to the entrance and allows a pet to go into the toilet.

No entrance is formed in the toilet by arranging the inner container into the outer container in such a manner that the position of the lower outer sidewall portion does not match the position of the lower inner sidewall portion, and thereby the lower outer sidewall portion is closed by the sidewall of the inner container, and the lower inner sidewall portion is closed by the sidewall of the outer container.

The present invention also provides a pet toilet including an outer container having a bottom, and a sidewall standing from a peripheral edge of the bottom; and an inner container arranged in the outer container and including a bottom having a duckboard structure that allows excretory fluid of a pet to pass, and a sidewall standing from a peripheral edge of the bottom.

The sidewall of the outer container or the sidewall of the inner container includes a wall height adjusting unit that adjusts a height of a part of the sidewall, and the wall height adjusting unit forms a low sidewall portion that is lower than the other part of the sidewall, and thereby forming an entrance for pet that permits a pet to go into the toilet.

The present invention also provides a method of using a pet toilet including an outer container including a bottom, and a sidewall standing from a peripheral edge of the bottom; and an inner container including a bottom having a duckboard structure that allows excretory fluid of a pet to pass, and a sidewall standing from a peripheral edge of the bottom. In the pet toilet, a lower outer sidewall portion is formed on a part of the sidewall of the outer container, and a lower inner sidewall portion is formed on a part of the sidewall of the inner container. The outer container and the inner container are relatively movable. The method including: a step of arranging the inner container into the outer container in such a manner that the position of the lower outer sidewall portion matches the position of the lower inner sidewall portion to form an entrance for pet from which a pet goes into the toilet and which is lower than the sidewall adjacent to the entrance, when the entrance is formed; and a step of closing the lower outer sidewall portion by the sidewall of the inner container, and closing the lower inner sidewall portion by the sidewall of the outer container by arranging the inner container into the outer container in such a manner that the position of the lower outer sidewall portion does not match the position of the lower inner sidewall portion, when the formation of the entrance is not desired.

BRIEF DESCRIPTION OF DRAWINGS

FIG. 8 is a perspective view illustrating an inner container used in a pet toilet according to still another embodiment of the present invention.

FIGS. 9(a) to 9(c) are perspective views illustrating a pet toilet according to still another embodiment of the present invention.

DESCRIPTION OF EMBODIMENTS

Figure 1:
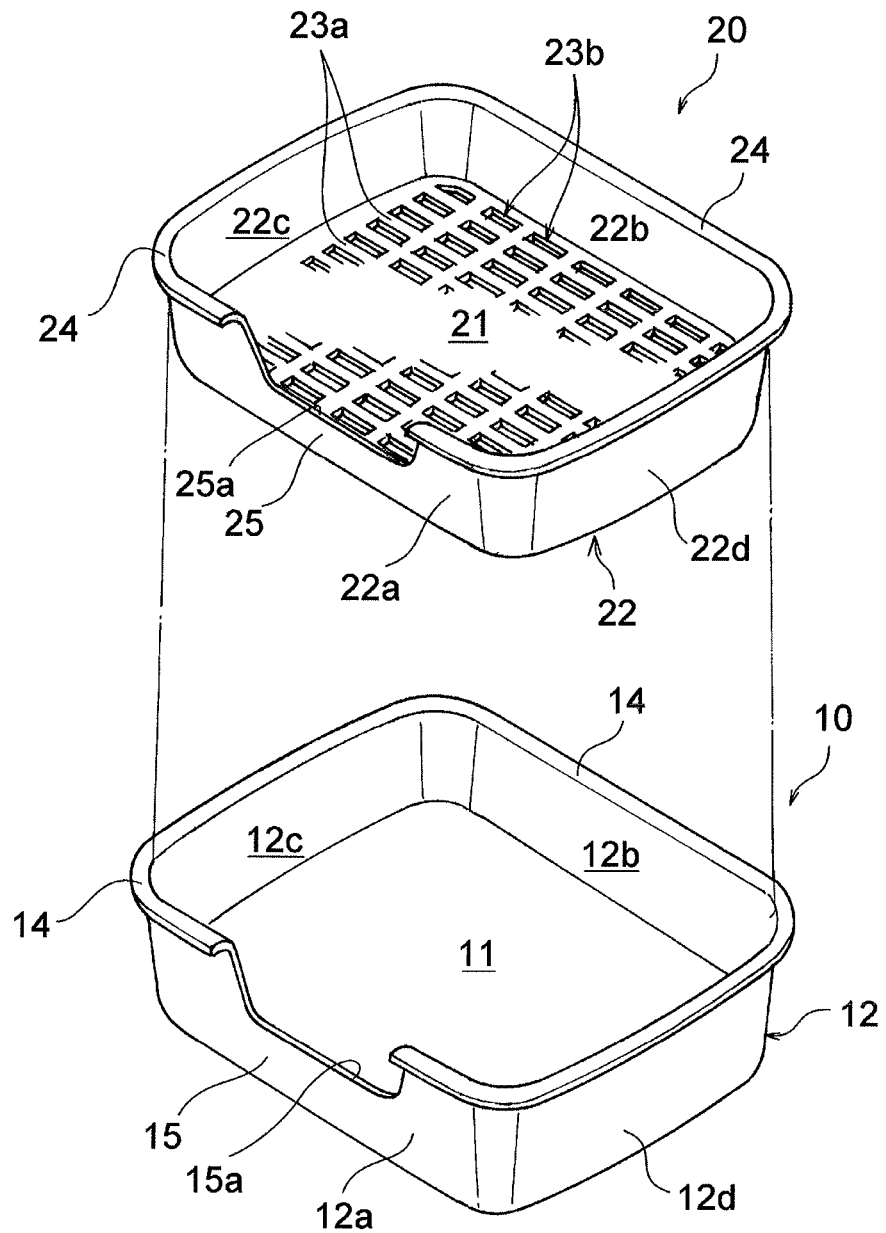
FIG. 1 is an exploded perspective view illustrating a pet toilet according to one embodiment of the present invention.

The present invention will be described below based upon preferable embodiments with reference to the drawings. A pet toilet according to the present invention is used to keep a small mammal such as a cat or a dog. A pet toilet of the embodiment illustrated in FIG. 1 includes two members that are an outer container 10 and an inner container 20. The outer container 10 and the inner container 20 are relatively movable. As illustrated in FIG. 1, the inner container 20 is nested in the outer container 10. The outer container 10 and the inner container 20 can be both manufactured by an injection molding of synthetic resin, for example.

The outer container 10 has a substantially rectangular bottom 11 in plan view. A wall portion 12 stands from the peripheral edge of the bottom 11. The wall portion 12 stands from the entire peripheral edge of the bottom 11. The wall portion 12 slightly tilts outward of the outer container 10. An upper end 14 of the wall portion 12 is folded outward of the outer container 10. The wall portion 12 includes a planar first wall portion 12a and a planar second wall portion 12b, which are located opposite to each other. The wall portion 12 also includes a planar third wall portion 12c and a planar fourth wall portion 12d, which are located opposite to each other.

The inner container 20 has a substantially rectangular bottom 21 in plan view. The bottom 21 has almost a similar figure of the bottom 11 of the outer container 10, and is smaller than the bottom 11. The bottom 21 has a duckboard structure that allows excretory fluid of a pet to pass. The duckboard structure is composed of a grid bar portions 23a and through-holes 23b formed by the bar portions 23a. A wall portion 22 stands from the peripheral edge of the bottom 21. The wall portion 22 stands from the entire peripheral edge of the bottom 21. The wall portion 22 slightly tilts outward of the inner container 20. An upper end 24 of the wall portion 22 is folded outward of the inner container 20. The wall portion 22 includes a planar first wall portion 22a and a planar second wall portion 22b, which are located opposite to each other. The wall portion 22 also includes a planar third wall portion 22c and a planar fourth wall portion 22d, which are located opposite to each other.

In the state in which the inner container 20 is arranged in the outer container 10, the upper end 24 of the wall portion 22 of the inner container 20 is brought into contact with the upper end 14 of the wall portion 12 of the outer container 10. With this structure, the inner container 20 is held in the outer container 10 in the nested manner, and the wall portion 22 of the inner container 20 and the wall portion 12 of the outer container 10 form a wall portion 3 that is a sidewall of a toilet 1. In this state, the bottom 21, having the duckboard structure, of the inner container 20 is separated upward from the bottom 11 of the outer container 10. Accordingly, a space is formed between the bottom 21 of the inner container 20 and the bottom 11 of the outer container 10. A mat-type liquid absorbing material (not illustrated) can be placed in this space, for example. The lower surface of the mat-type liquid absorbing material is in contact with the upper surface of the bottom 11 of the outer container 10. A granular material (not illustrated) having a size not passing through the opening 23b on the duckboard structure formed on the bottom 21 can be arranged on the bottom 21 of the inner container 20 according to a behavior of a subject animal.

As illustrated in FIG. 1, a part of the wall portion 12 of the outer container 10, specifically, almost the central part of the first wall portion 12a in the width direction, is cut out in almost a trapezoidal shape downward from the upper end 14 of the first wall portion 12a. Thus, a lower outer sidewall portion 15 that has a lower height than the other part of the wall portion 12 of the outer container 10 is formed on the first wall portion 12a. An upper end 15a of the lower outer sidewall portion 15 is substantially parallel to the upper end 14 of the other parts of the wall portion 12. The width of the upper end 15a is about 20 to 80% of the width of the first wall portion 12a.

Like the outer container 10, the wall portion 22 of the inner container 20 is cut out. Specifically, a part of the wall portion 22 of the inner container 20, specifically, almost the central part of the first wall portion 22a in the width direction, is cut out in almost a trapezoidal shape downward from the upper end 24 of the first wall portion 22a. Thus, a lower inner sidewall portion 25 that has a lower height than the other part of the wall portion 22 of the inner container 20 is formed on the first wall portion 22a. An upper end 25a of the lower inner sidewall portion 25 is substantially parallel to the upper end 24 of the other parts of the wall portion 22. The width of the upper end 25a is about 20 to 80% of the width of the first wall portion 22a.

Figure 2:
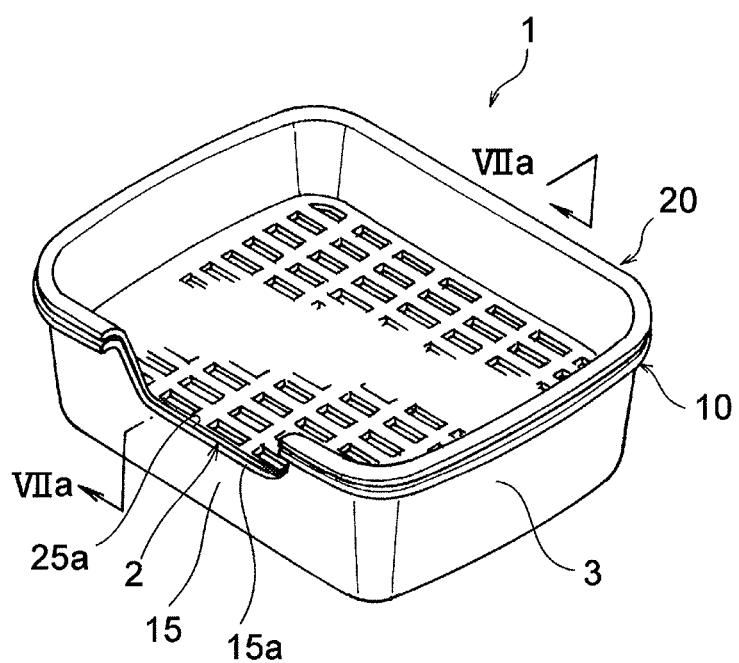
FIG. 2 is a perspective view illustrating the pet toilet according to one embodiment of the present invention.

In order to form the pet toilet by using the outer container 10 and the inner container 20 having the above-mentioned structure, the inner container 20 is arranged in the outer container 10 in such a manner that the position of the lower outer sidewall portion 15 matches the position of the lower inner sidewall portion 25, as illustrated in FIG. 1. Specifically, in the state in which the inner container 20 is arranged in the outer container 10, the first wall portion 12a of the outer container 10 and the first wall portion 22a of the inner container 20 face each other. According to this arrangement, the position of the lower outer sidewall portion 15 and position of the lower inner sidewall portion 25 match to form an entrance 2 for pet (hereinafter, also described as entrance 2), a height of which is lower than that of the other part of the wall portion 3 which is located on both the right side and the left side thereof, and from which a pet goes into the toilet 1, on the pet toilet 1 as illustrated in FIG. 2. The height of the entrance 2 is lower than that of the wall portion 3 of the toilet 1, and therefore, a young pet that is to be cared for can visually recognize the inside of the toilet 1 through the entrance 2. A young pet can go in the toilet 1 through the entrance 2. Even a pet having low physical performance can go in the toilet 1 through the entrance 2.

In the toilet 1 illustrated in FIG. 2, the upper end 15a of the lower outer sidewall portion 15 of the outer container 10 and the upper end 25a of the lower inner sidewall portion 25 of the inner container 20 are on the same position, more specifically, they are on the same height. However, instead of this structure, the upper end 15a of the lower outer sidewall portion 15 of the outer container 10 may be set higher than the upper end 25a of the lower inner sidewall portion 25 of the inner container 20, or the upper end 25a of the lower inner sidewall portion 25 of the inner container 20 may be set higher than the upper end 15a of the lower outer sidewall portion 15 of the outer container 10, on the contrary. The position of the lower outer sidewall portion 15 of the outer container 10 and the position of the lower inner sidewall portion 25 of the inner container 20 may be shifted from each other within a range of forming the entrance 2.

In the toilet 1 illustrated in FIG. 2, the width of the lower outer sidewall portion 15 and the width of the lower inner sidewall portion 25 are almost the same. However, instead of this structure, the width of the lower outer sidewall portion 15 may be set wider than the width of the lower inner sidewall portion 25, or the width of the lower inner sidewall portion 25 may be set wider than the width of the lower outer sidewall portion 15. The width of the entrance 2 of the toilet 1 is the narrower width in the width of the lower outer sidewall portion 15 and the width of the lower inner sidewall portion 25. The ultimate form of setting the width of the lower outer sidewall portion 15 wider than the width of the lower inner sidewall portion 25 is a structure in which all sidewall portions of the outer container 10 are set to have a height equal to or smaller than the height of the lower inner sidewall portion 25 of the inner container.

Figure 3:
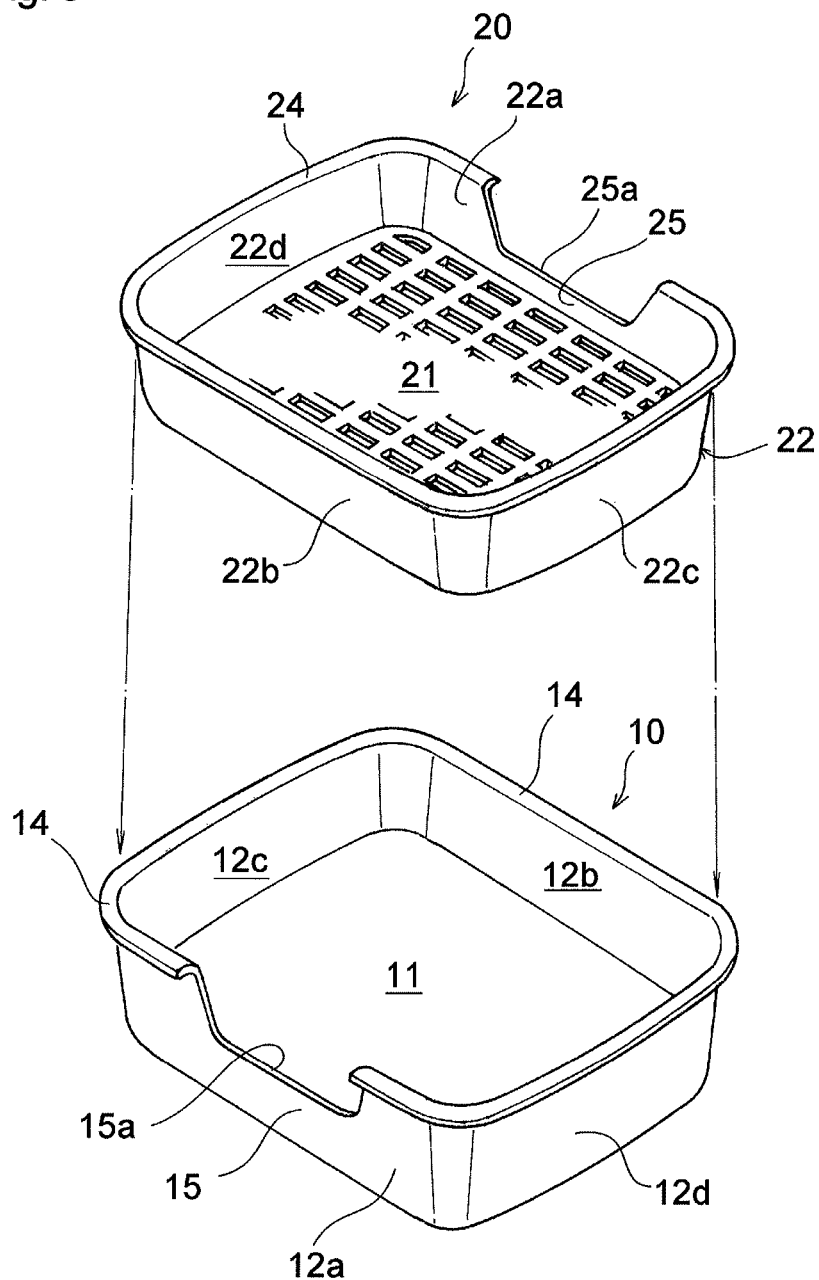
FIG. 3 is an exploded perspective view illustrating a pet toilet according to another embodiment of the present invention.
Figure 4:
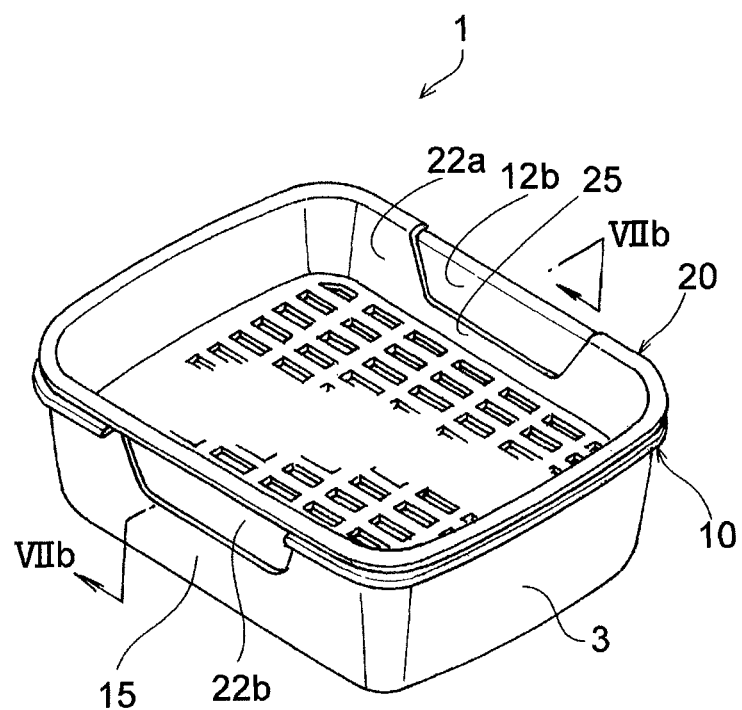
FIG. 4 is a perspective view illustrating the pet toilet according to another embodiment of the present invention.

The toilet 1 illustrated in FIG. 2 is useful for the case where a pet is young or has lower physical performance. However, in the case of keeping a healthy mature pet by using the toilet 1, granular substance (not illustrated) arranged on the bottom 21 of the inner container 20 might be scattered outside from the entrance 2. In view of this, in the case of keeping a healthy mature pet, the arrangement of the outer container 10 and the inner container 20 are changed from the arrangement in FIG. 2, whereby the scattering of granular substance can effectively be prevented. More specifically, as illustrated in FIG. 3, the inner container 20 is arranged into the outer container 10 in such a manner that the position of the lower outer sidewall portion 15 of the outer container 10 does not match the position of the lower inner sidewall portion 25 of the inner container 20. Specifically, the inner container 20 is arranged into the outer container 10 in such a manner that, in the wall portions 22 of the inner container 20, the second wall portion 22b that is located opposite to the first wall portion 22a having the lower inner sidewall portion 25 faces the lower outer sidewall portion 15 of the outer container 10. In addition, the inner container 20 is arranged into the outer container 10 in such a manner that, in the wall portions 12 of the outer container 10, the second wall portion 12b that is located opposite to the first wall portion 12a having the lower outer sidewall portion 15 faces the lower inner sidewall portion 25 of the inner container 20. Briefly, the outer container 10 is arranged in the same way illustrated in the embodiment in FIG. 1, but the inner container 20 is rotated 180 degrees in a plane from the embodiment illustrated in FIG. 1. With this arrangement, the lower outer sidewall portion 15 of the outer container 10 is closed by the second wall portion 22b that is a part of the sidewall of the inner container 20 in the pet toilet 1 as illustrated in FIG. 4. In addition, the lower inner sidewall portion 25 of the inner container 20 is closed by the second wall portion 12b that is a part of the sidewall of the outer container 10. As a result, different from the form illustrated in FIG. 2, the entrance is not formed on the toilet 1 illustrated in FIG. 4. Accordingly, the toilet 1 illustrated in FIG. 4 has a high wall portion 3 continuously formed all over the entire circumference. This structure can effectively prevent the granular substance from scattering outside over the wall portion 3, even if a healthy mature pet excretes in the toilet 1, and throws the granular substance on the excretion place after the excretion. The term "closed" includes not only the case where the height of the lower outer sidewall portion 15 of the outer container 10 becomes equal to the height of the sidewall around the lower outer sidewall portion, but also the lower outer sidewall portion 15 is closed such that the lower outer sidewall portion 15 becomes sufficiently high.

As described above, the pet toilet 1 according to the present embodiment can be used for a pet from its early days, and can keep an effect of preventing scatter of a liquid absorbing material even after the pet is grown. Accordingly, the pet toilet 1 according to the present embodiment eliminates a need to prepare a new toilet according to the growth of the pet, and can also be used even if the physical performance of the pet decreases.

Figure 5A:
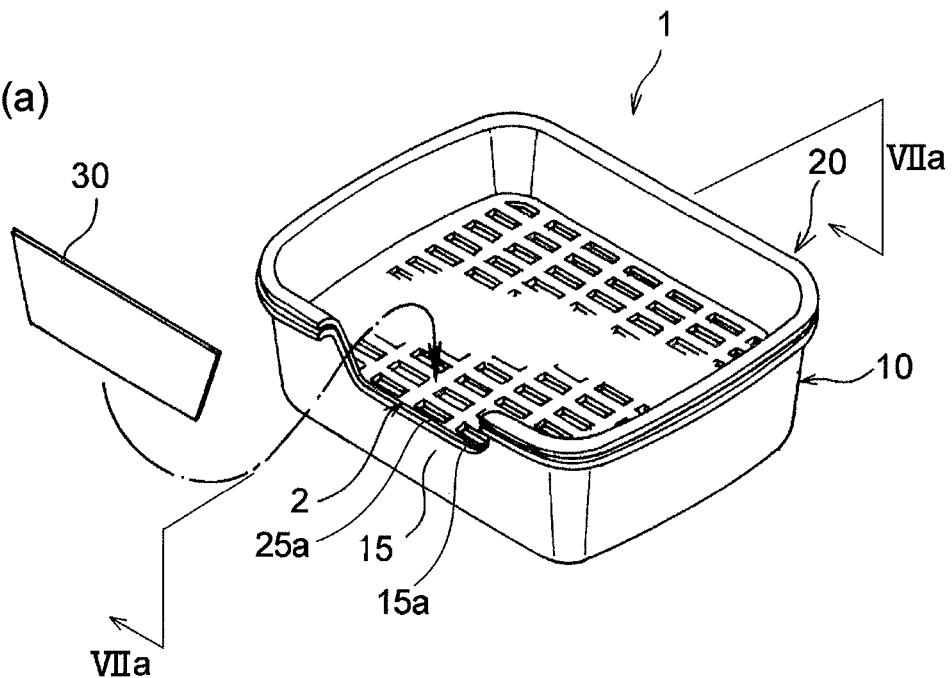
FIGS. 5(*a*) and 5(*b*) are perspective views illustrating a pet toilet according to another embodiment of the present invention.
Figure 5B:
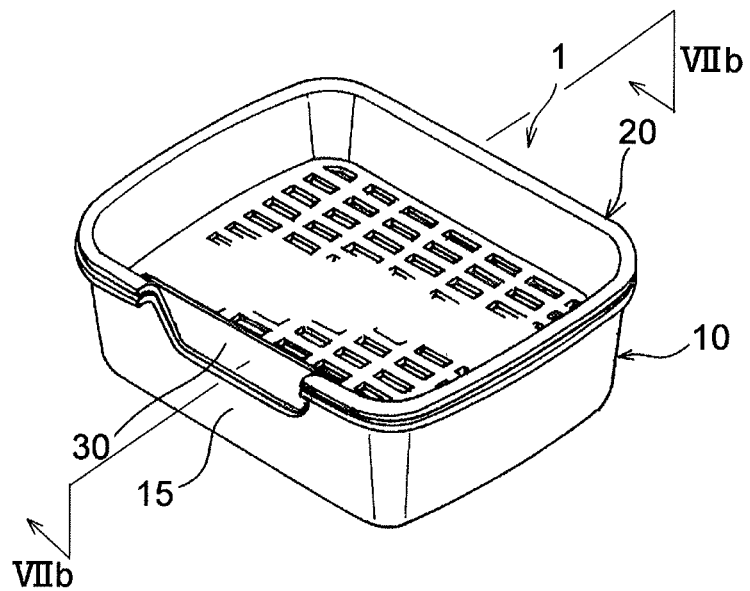

FIGS. 5(a) and 5(b) illustrate another embodiment of the pet toilet 1. In the toilet 1 illustrated in FIGS. 5(a) and 5(b), the wall portion 22 of the inner container 20 or the wall portion 12 of the outer container 10 includes a wall height adjusting unit that adjusts the height of a part of the wall portion 22 or the wall portion 12. In the case of keeping a healthy mature pet, the wall height adjusting unit is used to close the entrance 2 as illustrated in FIG. 5(b). On the other hand, when a pet is young, or a pet has low physical performance due to an old age, a low sidewall portion that is lower than the other part of the wall portion is formed on the wall portion 22 of the inner container 20 or on the wall portion 12 of the outer container 10 by using the wall height adjusting unit. Thus, the entrance 2 from which the pet easily goes in the toilet is formed as illustrated in FIG. 5(a).

Any member can be used for the wall height adjusting unit, so long as it can form the entrance 2 or close the entrance 2 according to need. For example, in the present embodiment, a plate-like closing member 30 that is a separate member from the outer container 10 and the inner container 20 is used as the wall height adjusting unit as illustrated in FIG. 5(a). The closing member 30 is detachable to the outer container 10 or the inner container 20. The entrance 2 is completely closed by attaching the closing member 30 on the lower outer sidewall portion 15 of the outer container 10 or the lower inner sidewall portion 25 of the inner container 20 as illustrated in FIG. 5(b). Accordingly, the toilet 1 illustrated in FIG. 5(b) has a high wall portion 3 continuously formed all over the entire circumference. This structure can effectively prevent the granular substance from scattering outside over the wall portion 3, even if a healthy mature pet excretes in the toilet 1, and throws the granular substance on the excretion place after the excretion. On the contrary, when the entrance 2 illustrated in FIG. 5(a) is formed on the toilet 1 in the state illustrated in FIG. 5(b), the closing member 30 is removed from the outer container 10 or the inner container 20 on which the closing member 30 is attached.

In the embodiment illustrated in FIGS. 5(a) and 5(b), the closing member 30 is attached to the inner container 20. In other words, the inner container 20 has the wall height adjusting unit, but the outer container 10 does not have the wall height adjusting unit. In this case, the low sidewall portion formed by using the wall height adjusting unit is the lower inner sidewall portion 25. On the contrary, when the inner container 20 does not have the wall height adjusting unit, but the outer container 10 has the wall height adjusting unit, the low sidewall portion formed by using the wall height adjusting unit is the lower outer sidewall portion 15.

In the toilet 1 according to each embodiment described above, the inner container illustrated in FIG. 6 can be used as the inner container 20. The inner container 20 illustrated in FIG. 6 has ribs 26 disposed on an outer face of the second wall portion 22*b* that is the wall portion located opposite to the lower inner sidewall portion 25. A pair of the ribs 26 is separated from each other and is formed to extend in the height direction of the wall portion 22. Each rib 26 is formed at the outside of the lower outer sidewall portion 15 in the width direction of the outer container 10, when the inner container 20 is arranged in the outer container 10. The advantages brought by the formation of the rib 26 will be described with reference to FIGS. 7(*a*) and 7(*b*).

Figure 6:
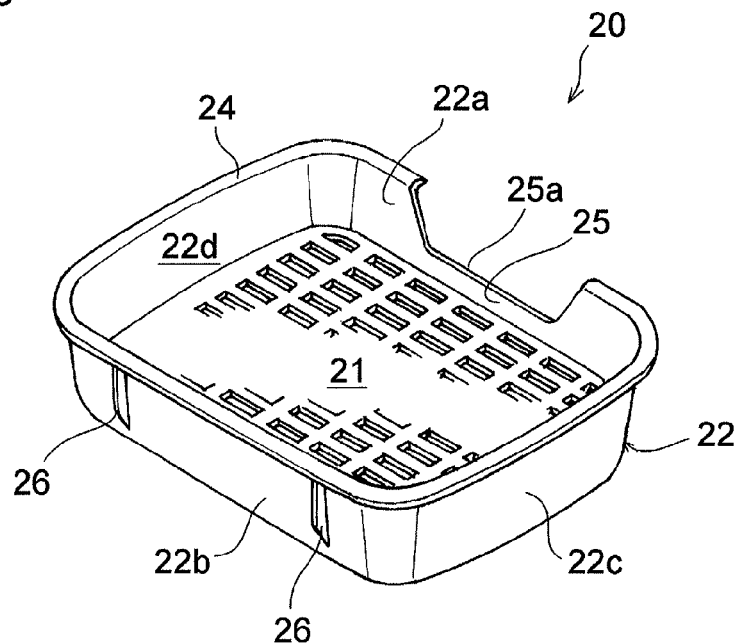
FIG. 6 is a perspective view illustrating an inner container used in a pet toilet according to another embodiment of the present invention.
Figure 7A:
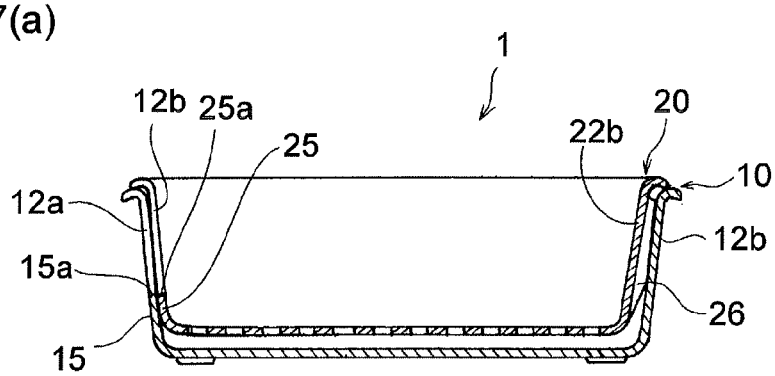
FIG. 7(a) is a sectional view taken along a line VIIa-VIIa in the pet toilet illustrated in FIGS. 2 and 5(a)
Figure 7B:
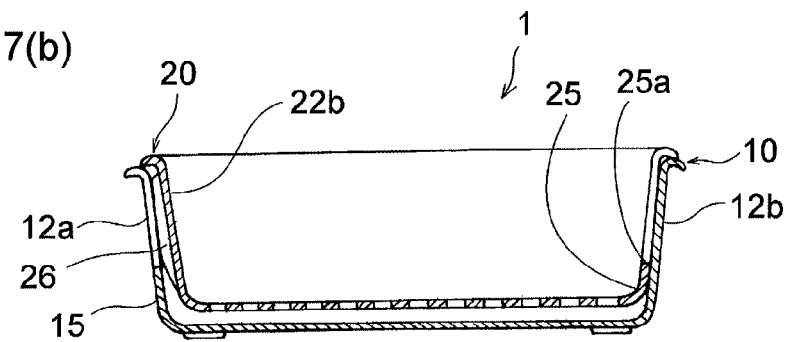
FIG. 7(b) is a sectional view taken along a line VIIb-VIIb in the pet toilet illustrated in FIGS. 4 and 5(b).

FIG. 7(*a*) is a sectional view of the toilet 1 illustrated in FIG. 2 and FIG. 5(*a*), taken along a line VIIa-VIIa line, when the inner container 20 illustrated in FIG. 6 is used. As illustrated in this figure, when the rib 26 formed on the inner container 20 is brought into contact with the inner surface of the second wall portion 12*b* that is a part of the sidewall of the outer container 10 in the state in which the inner container 20 is arranged in the outer container 10, the inner container 20 is pushed toward the side reverse to the sidewall (the second wall portion 22*b*) on which the rib 26 is formed. As a result, the upper end 25*a* of the lower inner sidewall portion 25 of the inner container 20 becomes close to the lower outer sidewall portion 15 of the outer container 10, whereby a gap formed between the lower inner sidewall portion 25 and the lower outer sidewall portion 15 is reduced. Accordingly, this structure can effectively prevent the granular substance from dropping between both low sidewall portions, and prevent excretory fluid from flowing between both low sidewall portions.

On the other hand, FIG. 7(*b*) is a sectional view of the toilet 1 illustrated in FIG. 4 and FIG. 5(*b*), taken along a line VIIb-VIIb line, when the inner container 20 illustrated in FIG. 6 is used. As illustrated in the same figure, the rib 26 disposed on the inner container 20 is brought into contact with the inner surface of the second wall portion 12*a* that is a part of the sidewall of the outer container 10 in the state in which the inner container 20 is arranged in the outer container 10. With this, the inner container 20 is pushed toward the side reverse to the sidewall (the second wall portion 22*b*) on which the rib 26 is formed. As a result, the upper end 25*a* of the lower inner sidewall portion 25 of the inner container 20 becomes close to the second wall portion 12*b* that is a part of the sidewall of the outer container 10, whereby a gap formed between the lower inner sidewall portion 25 and the second wall portion 12*b* is reduced. Accordingly, this structure can effectively prevent the granular substance from dropping between both portions, and prevent excretory fluid from flowing between both portions.

As described above, since the rib 26 is formed on the outer surface of the sidewall of the inner container 20, the gap formed between the outer container 10 and the inner container 20 can be reduced, even if the toilet 1 is used in any one of the forms illustrated in FIGS. 2, 4, 5(*a*), and 5(*b*). Accordingly, problems caused by the formation of the gap can be solved.

The gap formed between the outer container 10 and the inner container 20 can be reduced, and the problems caused by the formation of the gap can be solved, even by employing an inner container 20 illustrated in FIG. 8, instead of the formation of the rib 26 on the outer surface of the sidewall of the inner container 20. The inner container 20 illustrated in this figure includes a locking hook 27 disposed on the upper end 24 of the first wall portion 22*a* adjacent to the low sidewall portion 25. The locking hook 27 is formed integral with the inner container 20 by use of a hinge mechanism. The locking hook 27 is formed on each of the left side and the right side adjacent to the lower inner sidewall portion 25. When the locking hook 27 is hooked on the upper end 14 of the first wall portion 12*a* of the outer container 10 in the state in which the inner container 20 is arranged in the outer container 10 as illustrated in the embodiments in FIGS. 2 and 5(*a*), the upper end 25*a* of the lower inner sidewall portion 25 becomes close to the lower outer sidewall portion 15. Thus, the gap formed between the upper end 25*a* of the lower inner sidewall portion 25 and the lower outer sidewall portion 15 can be reduced.

Similarly, in the toilet 1 according to the embodiments illustrated in FIGS. 4 and 5(*b*), the locking hook 27 is hooked on the upper end of the second wall portion 12*b* of the outer container 10 in order to make the upper end 25*a* of the lower inner sidewall portion 25 close to the second wall portion 12*b* of the outer container 10. Thus, the gap formed between the upper end 25*a* of the lower inner sidewall portion 25 and the second wall portion 12*b* of the outer container 10 is reduced.

FIGS. 9(*a*) to 9(*c*) illustrate a pet toilet 1 according to another embodiment different from the embodiments described above. The embodiments illustrated in FIGS. 9(*a*) to 9(*c*) are modifications of the embodiments illustrated in FIGS. 5(*a*) and 5(*b*) previously described. In the toilet 1 according to the present embodiment, the inner container 20 has a low wall forming portion 25 as illustrated in FIG. 9(*a*), and this is similar to the embodiments described above. On the other hand, the outer container 10 does not have the low wall forming portion. Instead, it is configured such that the upper end 24 of the wall portion 22 of the inner container 20 is located above the upper end 14 of the wall portion 12 of the outer container 10, when the inner container 20 is arranged in the outer container 10.

When the upper end 14 of the wall portion 12 of the outer container 10 has the height equal to or lower than the height of the upper end 25*a* of the inner low wall forming portion 25 of the inner container 20 in the state that the inner container 20 is arranged in the outer container 10, the entrance 2 from which a pet goes into the toilet is formed, as illustrated in FIG. 9(*b*). This type of toilet 1 is useful for the case of keeping a young pet.

On the other hand, in the case of keeping a healthy mature pet, a closing member 30 that is separate from the outer container 10 and the inner container 20 is separately prepared, and the closing member 30 is attached to the inner low wall forming portion 25 of the inner container 20 to close the entrance 2, as illustrated in FIG. 9(*c*). The closing member described in the embodiment illustrated in FIG. 2 previously described can be used as the closing member 30. As described above, in the embodiment in FIG. 9, the wall height adjusting unit is provided on the inner container, but is not provided on the outer container, and the low sidewall portion formed by the wall height adjusting unit is the inner low wall forming portion 25.

Instead of the closing member 30 that is a separate member from the outer container 10 and the inner container 20, a closing member 130 illustrated in FIG. 10 may be used for the wall height adjusting unit. The closing member 130 illustrated in FIG. 10 includes a connection portion connected to the wall portion 22 of the inner container 20 and a non-connection portion that is not connected to the wall portion 22 and can be attached to and detached from the wall portion 22.

The closing member 130 will be described in detail with reference to FIGS. 10 and 11. In the embodiment illustrated in FIGS. 10 and 11, the closing member 130 is also provided on the inner container as in the embodiment illustrated in FIG. 9. When the height of the wall portion of the outer container and the height of the wall portion of the inner container are formed to be almost equal to each other as in the embodiments in FIGS. 1 to 8, the closing member 130 formed by a cut can be provided on the outer container, like the embodiments illustrated in FIGS. 10 and 11. The same applies to a later-described embodiment illustrated in FIG. 13.

In the embodiments illustrated in FIGS. 10 and 11, the inner container 20 includes two cuts 28 and 28 formed in a part of the first wall portion 22a, specifically a widthwisely central part of the first wall portion 22a, and extending downward from the upper end of the wall portion 22. The inner container 20 further include a linear thin portion 29 almost parallel to the upper end 24 of the wall portion 22 and formed between the lower ends of the two cuts 28 and 28. A swinging portion 31 located between the two cuts 28 and 28 swings about the thin portion 29 serving as a hinge. Consequently, the closing member 130 illustrated in FIGS. 10 and 11 is composed of the swinging portion 31 serving as the non-connection portion and the thin portion 29 serving as the connection portion.

Figure 10A:
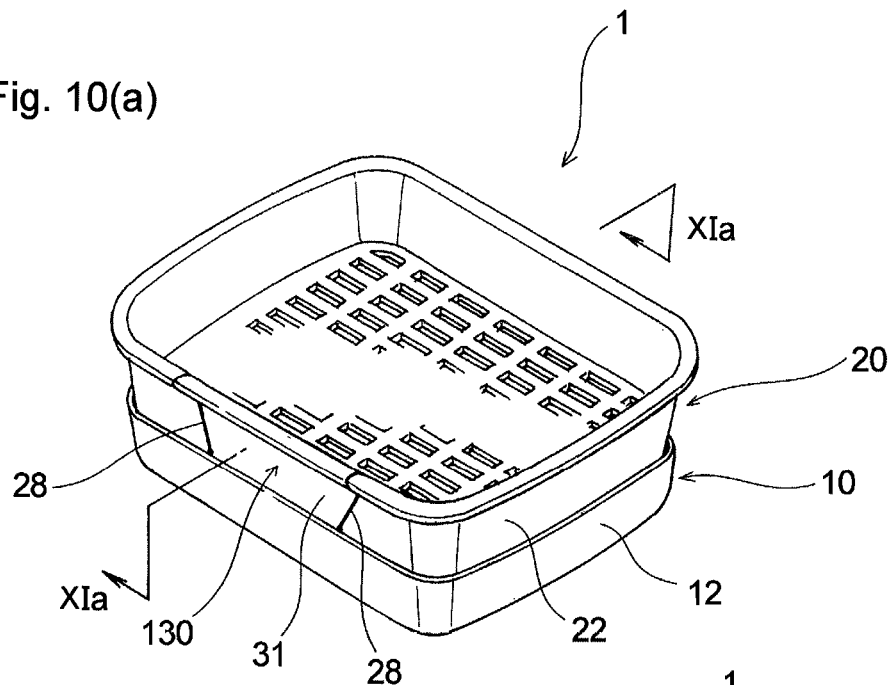
FIGS. 10(a) and 10(b) are perspective views illustrating a pet toilet according to still another embodiment of the present invention.
Figure 10B:
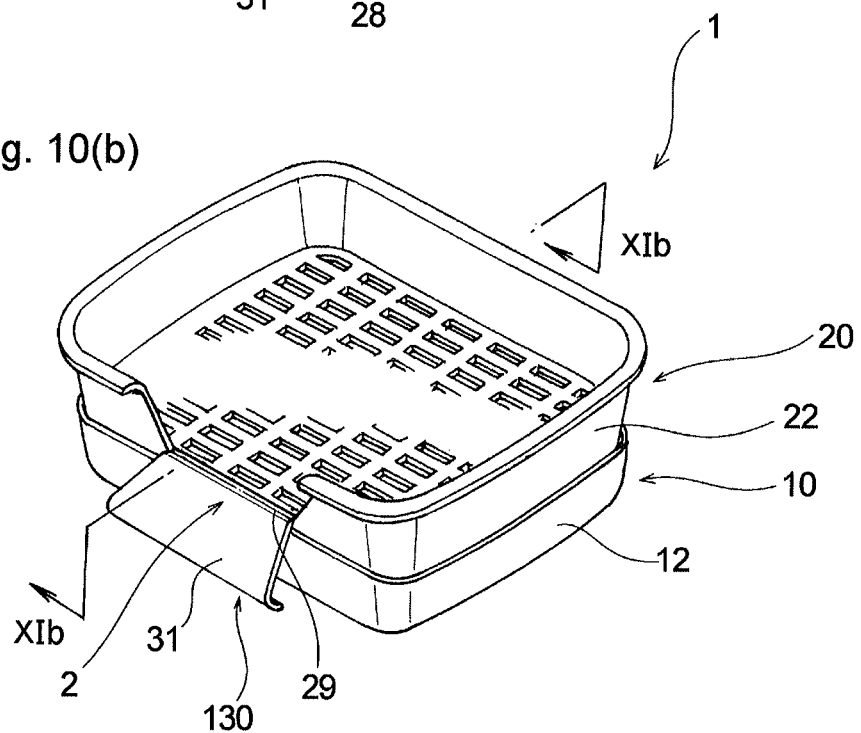
Figure 11A:
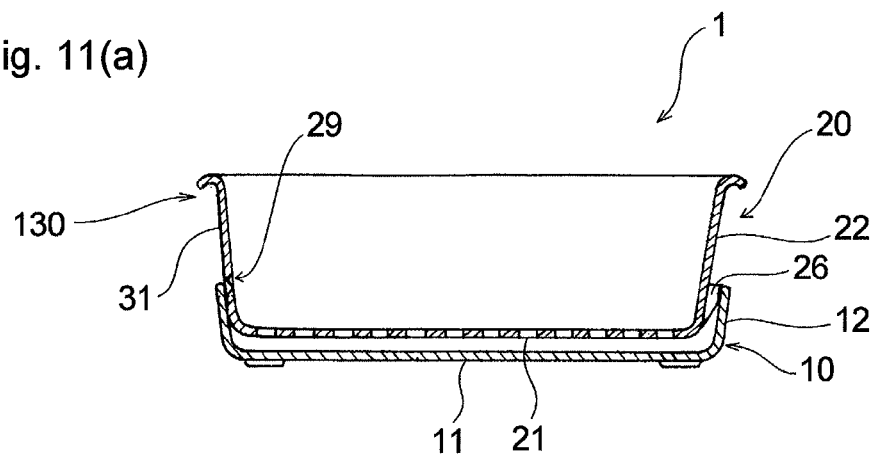
FIG. 11(a) is a sectional view taken along a line XIa-XIa in the pet toilet illustrated in FIG. 10(a)
Figure 11B:
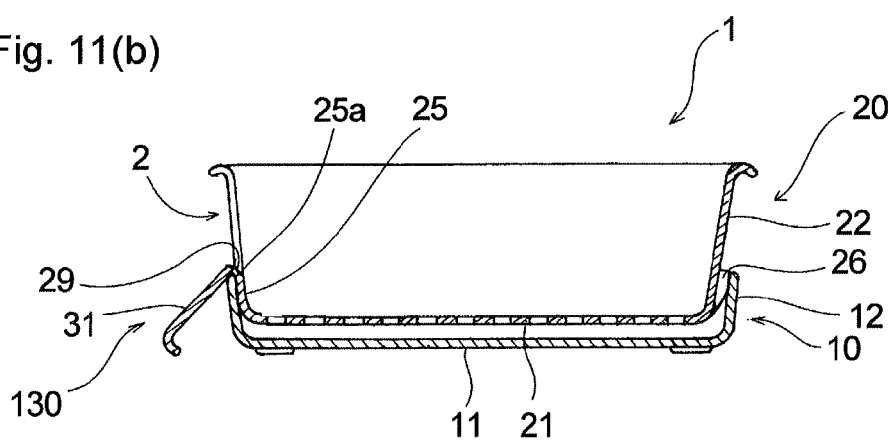
FIG. 11(b) is a sectional view taken along a line XIb-XIb in the pet toilet illustrated in FIG. 10(b).

When the toilet 1 is used to keep a healthy mature animal, the swinging portion 31 (non-connection portion) located between the two cuts 28 and 28 is made close to the wall portion 22 to allow the closing member 130 to serve as a part of the wall portion 22 as illustrated in FIGS. 10(a) and 11(b). In the case of keeping a young animal, the non-connection portion is separated from the wall portion 22, while keeping a connection state between the wall portion 22 and the closing member 130 by the thin portion 29 (connection portion), whereby the entrance 2 is formed, as illustrated in FIGS. 10(b) and 11(b). The low sidewall portion formed in this case is the inner low wall forming portion 25 that is lower than the other part of the wall portion 22, wherein the inner low wall forming portion 25 is formed since the swinging portion 31 located between the two cuts 28 and 28 does not form a part of the wall portion 22 due to its swing. When the connection portion is formed as the hinge structure as in the present embodiment, a hinge with a fitting structure can be employed instead of the thin portion.

When the closing member 130 is connected to the lower part of the wall portion as illustrated in FIGS. 10(b) and 11(a), the closing member 130 is configured to tilt outward of the container. Specifically, the swinging portion 31 located between two cuts 28 and 28 swings outward of the container about the thin portion 29 serving as a hinge. According to this structure, the closing member 130 can be used as a slope for guiding an animal to the entrance 2. Therefore, this structure is preferable for an animal having low physical performance. Especially, as illustrated in FIG. 10(a), the two cuts 28 and 28 extend downward so as to be close to each other, so that the swinging portion 31 located between the cuts 28 and 28 is formed to have a downward trapezoidal shape. According to such shape, the slope for guiding a pet is easy to be stabilized, and the pet is easy to go into the toilet through the slope.

The connection method between the closing member 130 and the container may be a sliding unit or a flip-up unit (so-called gullwing system), instead of the hinge structure provided on the lower part of the wall portion.

Figure 12:
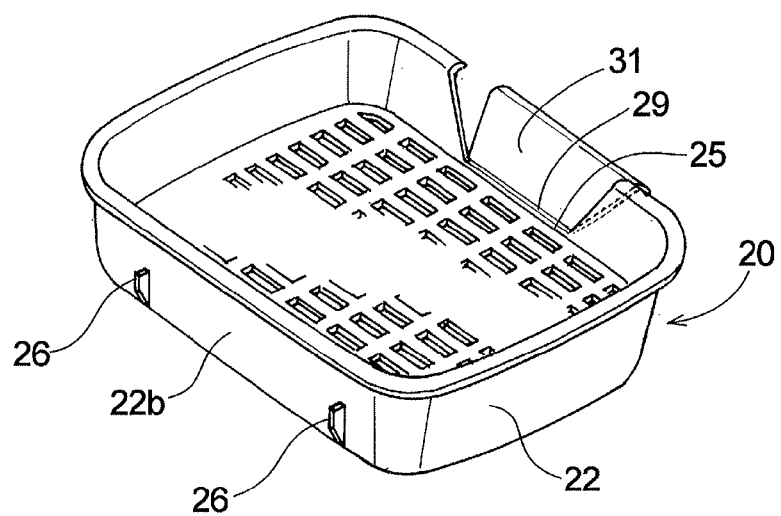
FIG. 12 is a perspective view of the inner container illustrated in FIG. 10 viewed from a different direction.

As illustrated in FIG. 12, the rib similar to the rib illustrated in FIG. 6 may be formed on the outer surface of the wall portion 22b which is located opposite to the inner low wall forming portion 25 of the inner container 20 in the toilet 1 according to the embodiment illustrated in FIGS. 10 and 11. Notably, the rib 26 in FIG. 12 is formed on the lower part of the wall portion 22b of the inner container 20 corresponding to the height of the wall portion 12 of the outer container 10. When the rib 26 is brought into contact with the inner surface of the wall portion 12 of the outer container 10, the upper end 25a of the inner low wall forming portion 25 of the inner container 20 becomes close to the wall portion 12 of the outer container 10 as illustrated in FIGS. 11(a) and 11(b), whereby the gap formed between the upper end 25a of the inner low wall forming portion 25 of the inner container 20 and the wall portion 12 of the outer container 10 can be reduced. Thus, the stability of the slope formed by swinging the closing member 130 is enhanced, whereby the slope is difficult to wobble when a pet walks on the slope.

Figure 13:
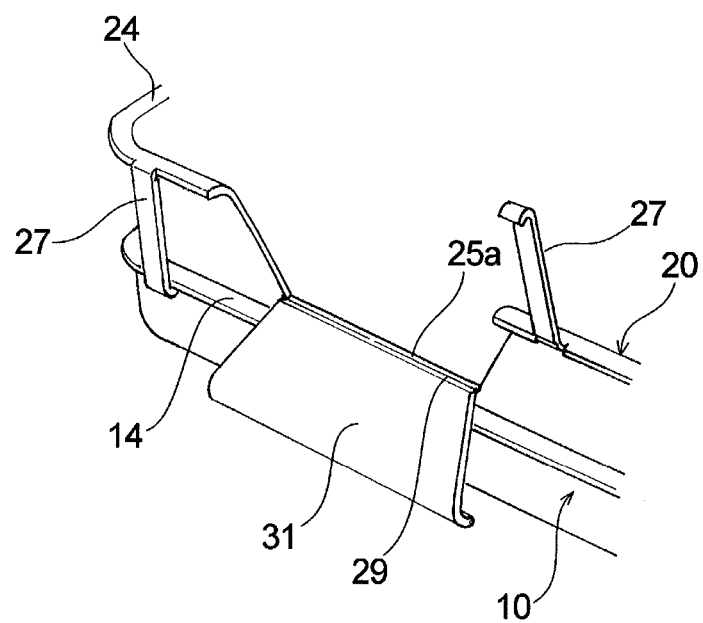
FIG. 13 is a perspective view illustrating a pet toilet according to still another embodiment of the present invention.

Even when the upper end 14 of the wall portion 12 of the outer container 10 is formed to have the height same as or lower than the height of the upper end 25a of the low sidewall portion formed on the inner container as in the embodiments in FIGS. 10 and 11, the gap formed between the upper end of the inner low wall forming portion 25 of the inner container 20 and the wall portion 12 of the outer container 10 can be reduced by using the locking hook 27 as illustrated in FIG. 13. The locking hook 27 illustrated in FIG. 13 is the same as the locking hook 27 illustrated in FIG. 5, except that the locking hook 27 in FIG. 13 is formed to be relatively long, considering the height difference between the wall portion 12 of the inner container 20 and the wall portion 22 of the outer container 10. The effect similar to the one described above can be obtained even by reducing the gap between the upper end of the inner low wall forming portion 25 of the inner container 20 and the wall portion 12 of the outer container 10 by hooking the locking hook 27 onto the upper end 14 of the wall portion 12 of the outer container 10.

The toilet 1 according to each of the embodiments described above is well adaptable for keeping a mammal small animal such as a cat or a dog, and particularly well adaptable for keeping a cat that is an animal having a behavior of throwing sand after urination.

While the preferable embodiments of the present invention have been described above, the present invention is not limited to these embodiments. For example, the pet toilets illustrated in FIGS. 1 to 13 includes the bottom 11 of the outer container 10 and bottom 21 of the inner container 20 which have almost a rectangular shape in a plane, and four wall portion. However, the outer container and the inner container may have three, five, or more wall portions. The wall portion is not limited to have a flat face, but may have a curved face. For example, a bottomed cylindrical container may be used as the outer container and the inner container.

The toilet 1 according to each of the embodiments described above has only one entrance. However, the toilet 1 may have two or more entrances. For example, in the embodiments illustrated in FIGS. 1 to 13, a lower outer sidewall portion is formed on two adjacent wall portions of the outer container 10, e.g., on the first wall portion 12a and the third wall portion 12c, and, in the inner container 20, a lower inner sidewall portion can be formed on the first wall portion 22a and the third wall portion 22c, corresponding to the outer container 10. The low sidewall portion may similarly be formed on the corner portion of the two adjacent wall portions. With this structure, the entrance can be formed on each of the two adjacent wall portions of the toilet 1. In order to close these two entrances, the inner container 20 may only be rotated 180 degrees in a planar direction.

With reference to the embodiments described above, the present invention also describes the pet toilets described below.

<1> A pet toilet comprising an outer container including a bottom, and a sidewall standing from a peripheral edge of the bottom; and an inner container including a bottom having a duckboard structure that allows excretory fluid of a pet to pass, and a sidewall standing from a peripheral edge of the bottom, wherein
 a lower outer sidewall portion is formed on a part of the sidewall of the outer container, the lower outer sidewall portion having a lower height than the other part of the sidewall of the outer container,
 a lower inner sidewall portion is formed on a part of the sidewall of the inner container, the lower inner sidewall portion having a lower height than the other part of the sidewall of the inner container,
 the outer container and the inner container are relatively movable,
 an entrance for pet is formed in the toilet by arranging the inner container into the outer container in such a manner that the position of the lower outer sidewall portion matches the position of the lower inner sidewall portion, a height of the entrance is lower than that of a sidewall adjacent to the entrance and allows a pet to go into the toilet, and
 no entrance is formed in the toilet by arranging the inner container into the outer container in such a manner that the position of the lower outer sidewall portion does not match the position of the lower inner sidewall portion, and thereby the lower outer sidewall portion is closed by the sidewall of the inner container, and the lower inner sidewall portion is closed by the sidewall of the outer container.

<2> The pet toilet according to <1> described above, wherein the inner container includes a rib disposed on an outer surface of the sidewall which is positioned opposite to the lower inner sidewall portion, and
 in a state in which the inner container is arranged in the outer container, the rib is brought into contact with the inner surface of the sidewall of the outer container to allow the upper end of the lower inner sidewall portion to be close to the lower outer sidewall portion or the sidewall of the outer container, thereby reducing a gap formed between the upper end of the lower inner sidewall portion and the lower outer sidewall portion or a wall portion of the outer container.

<3> The pet toilet according to <1> described above, wherein the inner container includes a locking hook which is disposed on an upper end of the sidewall adjacent to the lower inner sidewall portion, and in a state in which the inner container is arranged in the outer container, the locking hook is hooked on the upper end of the sidewall of the outer container to allow the upper end of the lower inner sidewall portion to be close to the lower outer sidewall portion or the sidewall of the outer container, thereby reducing a gap formed between the upper end of the lower inner sidewall portion and the lower outer sidewall portion or the sidewall of the outer container.

<4> A pet toilet comprising an outer container having a bottom, and a sidewall standing from a peripheral edge of the bottom; and an inner container arranged in the outer container and including a bottom having a duckboard structure that allows excretory fluid of a pet to pass, and a sidewall standing from a peripheral edge of the bottom,
 wherein the sidewall of the outer container or the sidewall of the inner container includes a wall height adjusting unit that adjusts a height of a part of the sidewall, and the wall height adjusting unit forms a low sidewall portion that is lower than the other part of the sidewall, and thereby forming an entrance for pet that permits a pet to go into the toilet.

<5> The pet toilet according to <4> described above, wherein one of the outer container and the inner container includes the wall height adjusting unit, and the other one does not include the wall height adjusting unit,
 a low wall forming portion that is lower than the other part of the sidewall is formed on a part of the sidewall of the container that does not include the wall height adjusting unit, and
 the entrance is formed by arranging the inner container into the outer container in such a manner that the position of the low sidewall portion formed on the container having the wall height adjusting unit matches the position of the low wall forming portion formed on the container that does not include the wall height adjusting unit.

<6> The pet toilet according to <4> described above, wherein the wall height adjusting unit is provided on the inner container, and
 when the low sidewall portion is formed on the sidewall of the inner container by the wall height adjusting unit, the position of the upper end of the sidewall of the outer container is set to be equal to or lower than the position of the upper end of the low sidewall portion.

<7> The pet toilet according to any one of <4> to <6> described above, wherein the wall height adjusting unit is a member detachable to the sidewall of the container having the wall height adjusting unit, and the entrance is formed by removing the member from the sidewall.

<8> The pet toilet according to any one of <4> to <7> described above, wherein the wall height adjusting unit includes a connection portion connected to the sidewall of the container having the wall height adjusting unit, and a non-connection portion that is not connected to the sidewall and that can be attached to or detached from the sidewall, and the entrance is formed by separating the non-connection portion from the sidewall, while keeping a connection state between the sidewall and the wall height adjusting unit by the connection portion.

<9> The pet toilet according to <8> described above, wherein the outer container or the inner container includes two cuts formed in a part of the sidewall and extending downward from the upper end of the sidewall, and a linear thin portion that is substantially parallel to the upper end of the sidewall and formed between lower ends of the two cuts, the wall height adjusting unit being composed of a swinging portion that is located between the two cuts and that swings about the thin portion serving as a hinge, and the thin portion, and
 the entrance and a slope that guides a pet to the entrance are formed by swinging the swinging portion, which is located between the two cuts and which swings, outward of the container about the thin portion used as a hinge.

<10> The pet toilet according to <5> described above, wherein, the inner container includes the wall height adjusting unit, and a rib disposed on an outer surface of the sidewall which is positioned opposite to the low sidewall portion, and the rib is brought into contact with the inner surface of the sidewall of the outer container to allow the upper end of the low sidewall portion of the inner container to be close to the low wall forming portion of the outer container, thereby reducing a gap formed between the upper end of the low sidewall portion of the inner container and the low wall forming portion of the outer container, or
 the outer container includes the wall height adjusting unit, and a rib disposed on an outer surface of the sidewall which is positioned opposite to the low wall forming portion, and the rib is brought into contact with the inner surface of the sidewall of the outer container to allow the upper end of the low wall forming portion of the inner container to be close to the low sidewall portion of the outer container, thereby reducing a gap formed between the upper end of the low wall forming portion of the inner container and the low sidewall portion of the outer container.

<11> The pet toilet according to <6> described above, wherein the inner container includes a rib disposed on an outer surface of the sidewall which is positioned opposite to the low sidewall portion, and the rib is brought into contact with the inner surface of the sidewall of the outer container to allow the upper end of the low sidewall portion of the inner container to be close to the sidewall of the outer container, thereby reducing a gap formed between the upper end of the low sidewall portion of the inner container and the sidewall of the outer container.

<12> The pet toilet according to <5> described above, wherein, when the inner container includes the wall height adjusting unit, a locking hook is provided on an upper end of the sidewall adjacent to the low sidewall portion of the inner container, and the locking hook is hooked on the upper end of the sidewall of the outer container to allow the upper end of the low sidewall portion of the inner container to be close to the low wall forming portion of the outer container, thereby reducing a gap formed between the upper end of the low sidewall portion of the inner container and the low wall forming portion of the outer container, and when the outer container includes the wall height adjusting unit, a locking hook is provided on an upper end of the sidewall adjacent to the low wall forming portion of the inner container, and the locking hook is hooked on the upper end of the sidewall of the outer container to allow the upper end of the low wall forming portion of the inner container to be close to the low sidewall portion of the outer container, thereby reducing a gap formed between the upper end of the low wall forming portion of the inner container and the low sidewall portion of the outer container.

<13> The pet toilet according to <6> described above, wherein the inner container includes a locking hook which is provided on an upper end of the sidewall adjacent to the low sidewall portion of the inner container, and the locking hook is hooked on the upper end of the sidewall of the outer container to allow the upper end of the low sidewall portion of the inner container to be close to the sidewall of the outer container, thereby reducing reduce a gap formed between the upper end of the low sidewall portion of the inner container and the sidewall of the outer container.

<14> The pet toilet according to any one of <1> to <13> described above, wherein a space is formed between the bottom of the inner container and the bottom of the outer container.

<15> The pet toilet according to any one of <1> to <14> described above, wherein a width of an upper end of the lower outer sidewall portion is 20 to 80% of the width of the wall portion where the lower outer sidewall portion is formed.

<16> The pet toilet according to any one of <1> to <15> described above, wherein a width of an upper end of the lower inner sidewall portion is 20 to 80% of the width of the wall portion where the lower inner sidewall portion is formed.

<17> The pet toilet according to <2> described above, wherein the plural ribs are formed in such a manner that the ribs extend in a height direction of the sidewall, and are separated from each other.

<18> The pet toilet according to <3> described above, wherein the locking hook is formed integral with the inner container with a hinge mechanism.

<19> The pet toilet according to <3> or <18> described above, wherein the plural locking hooks are provided on the right side and on the left side which are adjacent to the lower inner sidewall portion.

<20> The pet toilet according to <7> described above, wherein the member has a plate-like shape.

<21> The pet toilet according to <10> or <11> described above, wherein the plural ribs are formed in such a manner that the ribs extend in a height direction of the sidewall, and are separated from each other.

<22> The pet toilet according to <12> or <13> described above, wherein the locking hook is formed integral with the inner container with a hinge mechanism.

<23> The pet toilet according to <12>, <13>, or <22> described above, wherein the plural locking hooks are provided on the right side and on the left side which are adjacent to the lower inner sidewall portion.

<24> The pet toilet according to <9> described above, wherein the two cuts extend downward to close to each other, and the portion is formed to have a downward trapezoidal shape.

<25> The pet toilet according to any one of <1> to <24> described above, being used to breed a cat.

<26> A method of using a pet toilet comprising an outer container including a bottom, and a sidewall standing from a peripheral edge of the bottom; and an inner container including a bottom having a duckboard structure that allows excretory fluid of a pet to pass, and a sidewall standing from a peripheral edge of the bottom, wherein a lower outer sidewall portion is formed on a part of the sidewall of the outer container, and a lower inner sidewall portion is formed on a part of the sidewall of the inner container, and the outer container and the inner container are relatively movable, the method comprising:

a step of arranging the inner container into the outer container in such a manner that the position of the lower outer sidewall portion matches the position of the lower inner sidewall portion to form an entrance for pet from which a pet goes into the toilet and which is lower than the sidewall adjacent to the entrance, when the entrance is formed; and a step of closing the lower outer sidewall portion by the sidewall of the inner container, and closing the lower inner sidewall portion by the sidewall of the outer container by arranging the inner container into the outer container in such a manner that the position of the lower outer sidewall portion does not match the position of the lower inner sidewall portion, when the formation of the entrance is not desired.

INDUSTRIAL APPLICABILITY

A pet toilet according to the present invention can be used for a pet from its early days, and can keep an effect of preventing scatter of sand even after the pet is grown. Accordingly, the pet toilet according to the present invention eliminates a need to prepare a new toilet according to the growth of the pet, so that it is economical. The pet toilet is also useful for a pet having low physical performance.

The invention claimed is:

1. A pet toilet comprising an outer container including a bottom, and a sidewall standing from a peripheral edge of the bottom; and an inner container including a bottom having a duckboard structure that allows excretory fluid of a pet to pass, and a sidewall standing from a peripheral edge of the bottom, wherein a lower outer sidewall portion is formed on a part of the sidewall of the outer container, the lower outer sidewall portion having a lower height than the other part of the sidewall of the outer container, a lower inner sidewall portion is formed on a part of the sidewall of the inner container, the lower inner sidewall portion having a lower height than the other part of the sidewall of the inner container, the outer container and the inner container are relatively movable, an entrance for pet is formed in the toilet by arranging the inner container into the outer container in such a manner that the position of the lower outer sidewall portion matches the position of the lower inner sidewall portion, a height of the entrance is lower than that of a sidewall adjacent to the entrance and allows a pet to go into the toilet, no entrance is formed in the toilet by arranging the inner container into the outer container in such a manner that the position of the lower outer sidewall portion does not match the position of the lower inner sidewall portion, and thereby the lower outer sidewall portion is closed by the sidewall of the inner container, and the lower inner sidewall portion is closed by the sidewall of the outer container, the inner container includes a locking hook which is disposed on an upper end of the sidewall adjacent to the lower inner sidewall portion, and in a state in which the inner container is arranged in the outer container, the locking hook is hooked on the upper end of the sidewall of the outer container to allow the upper end of the lower inner sidewall portion to be close to the lower outer sidewall portion or the sidewall of the outer container, thereby reducing a gap formed between the upper end of the lower inner sidewall portion and the lower outer sidewall portion or the sidewall of the outer container.

2. The pet toilet according to claim 1, wherein the inner container includes a rib disposed on an outer surface of the sidewall which is positioned opposite to the lower inner sidewall portion, and in a state in which the inner container is arranged in the outer container, the rib is brought into contact with the inner surface of the sidewall of the outer container to allow the upper end of the lower inner sidewall portion to be close to the lower outer sidewall portion or the sidewall of the outer container, thereby reducing a gap formed between the upper end of the lower inner sidewall portion and the lower outer sidewall portion or a wall portion of the outer container.

3. A pet toilet comprising an outer container having a bottom, and a sidewall standing from a peripheral edge of the bottom; and an inner container arranged in the outer container and including a bottom having a duckboard structure that allows excretory fluid of a pet to pass, and a sidewall standing from a peripheral edge of the bottom, wherein the sidewall of the outer container or the sidewall of the inner container includes a wall height adjusting unit that adjusts a height of a part of the sidewall, and the wall height adjusting unit forms a low sidewall portion that is lower than the other part of the sidewall, and thereby forming an entrance for pet that permits a pet to go into the toilet.

4. The pet toilet according to claim 3, wherein one of the outer container and the inner container includes the wall height adjusting unit, and the other one does not include the wall height adjusting unit, a low wall forming portion that is lower than the other part of the sidewall is formed on a part of the sidewall of the container that does not include the wall height adjusting unit, and the entrance is formed by arranging the inner container into the outer container in such a manner that the position of the low sidewall portion formed on the container having the wall height adjusting unit matches the position of the low wall forming portion formed on the container that does not include the wall height adjusting unit.

5. The pet toilet according to claim 4, wherein, the inner container includes the wall height adjusting unit, and a rib disposed on an outer surface of the sidewall which is positioned opposite to the low sidewall portion, and the rib is brought into contact with the inner surface of the sidewall of the outer container to allow the upper end of the low sidewall portion of the inner container to be close to the low wall forming portion of the outer container, thereby reducing a gap formed between the upper end of the low sidewall portion of the inner container and the low wall forming portion of the outer container, or the outer container includes the wall height adjusting unit, and a rib disposed on an outer surface of the sidewall which is positioned opposite to the low wall forming portion, and the rib is brought into contact with the inner surface of the sidewall of the outer container to allow the upper end of the low wall forming portion of the inner container to be close to the low sidewall portion of the outer container, thereby reducing a gap formed between the upper end of the low wall forming portion of the inner container and the low sidewall portion of the outer container.

6. The pet toilet according to claim 4, wherein, when the inner container includes the wall height adjusting unit, a locking hook is provided on an upper end of the sidewall adjacent to the low sidewall portion of the inner container, and the locking hook is hooked on the upper end of the sidewall of the outer container to allow the upper end of the low sidewall portion of the inner container to be close to the low wall forming portion of the outer container, thereby reducing a gap formed between the upper end of the low sidewall portion of the inner container and the low wall forming portion of the outer container, and when the outer container includes the wall height adjusting unit, a locking hook is provided on an upper end of the sidewall adjacent to the low wall forming portion of the inner container, and the locking hook is hooked on the upper end of the sidewall of the outer container to allow the upper end of the low wall forming portion of the inner container to be close to the low sidewall portion of the outer container, thereby reducing a gap formed between the upper end of the low wall forming portion of the inner container and the low sidewall portion of the outer container.

7. The pet toilet according to claim 3, wherein the wall height adjusting unit is provided on the inner container, and when the low sidewall portion is formed on the sidewall of the inner container by the wall height adjusting unit, the position of the upper end of the sidewall of the outer container is set to be equal to or lower than the position of the upper end of the low sidewall portion.

8. The pet toilet according to claim 7, wherein the inner container includes a rib disposed on an outer surface of the sidewall which is positioned opposite to the low sidewall portion, and the rib is brought into contact with the inner surface of the sidewall of the outer container to allow the upper end of the low sidewall portion of the inner container to be close to the sidewall of the outer container, thereby reducing a gap formed between the upper end of the low sidewall portion of the inner container and the sidewall of the outer container.

9. The pet toilet according to claim 7, wherein the inner container includes a locking hook which is provided on an upper end of the sidewall adjacent to the low sidewall portion of the inner container, and the locking hook is hooked on the upper end of the sidewall of the outer container to allow the upper end of the low sidewall portion of the inner container to be close to the sidewall of the outer container, thereby reducing a gap formed between the upper end of the low sidewall portion of the inner container and the sidewall of the outer container.

10. The pet toilet according to claim 3, wherein the wall height adjusting unit is a member detachable to the sidewall of the container having the wall height adjusting unit, and the entrance is formed by removing the member from the sidewall.

11. The pet toilet according to claim 3, wherein the wall height adjusting unit includes a connection portion connected to the sidewall of the container having the wall height adjusting unit, and a non-connection portion that is not connected to the sidewall and that can be attached to or detached from the sidewall, and the entrance is formed by separating the non-connection portion from the sidewall, while keeping a connection state between the sidewall and the wall height adjusting unit by the connection portion.

12. The pet toilet according to claim 11, wherein the outer container or the inner container includes two cuts formed in a part of the sidewall and extending downward from the upper end of the sidewall, and a linear thin portion that is substantially parallel to the upper end of the sidewall and formed between lower ends of the two cuts, the wall height adjusting unit being composed of a swinging portion that is located between the two cuts and that swings about the thin portion serving as a hinge, and the thin portion, and the entrance and a slope that guides a pet to the entrance are formed by swinging the swinging portion, which is located between the two cuts and which swings, outward of the container about the thin portion used as a hinge.

13. A method of using a pet toilet comprising an outer container including a bottom, and a sidewall standing from a peripheral edge of the bottom; and an inner container including a bottom having a duckboard structure that allows excretory fluid of a pet to pass, and a sidewall standing from a peripheral edge of the bottom, wherein a lower outer sidewall portion is formed on a part of the sidewall of the outer container, and a lower inner sidewall portion is formed on a part of the sidewall of the inner container, and the outer container and the inner container are relatively movable, the method comprising:

a step of arranging the inner container into the outer container in such a manner that the position of the lower outer sidewall portion matches the position of the lower inner sidewall portion to form an entrance for pet from which a pet goes into the toilet and which is lower than the sidewall adjacent to the entrance, when the entrance is formed; and a step of closing the lower outer sidewall portion by the sidewall of the inner container, and closing the lower inner sidewall portion by the sidewall of the outer container by arranging the inner container into the outer container in such a manner that the position of the lower outer sidewall portion does not match the position of the lower inner sidewall portion, when the formation of the entrance is not desired.

* * * * *